United States Patent
Nakaoka et al.

(10) Patent No.: US 11,523,044 B2
(45) Date of Patent: Dec. 6, 2022

(54) FOCUS DETECTION APPARATUS AND METHOD, AND IMAGE CAPTURING APPARATUS

(71) Applicant: CANON KABUSHIKI KAISHA, Tokyo (JP)

(72) Inventors: Hiroshi Nakaoka, Saitama (JP); Yohei Horikawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 138 days.

(21) Appl. No.: 17/067,393

(22) Filed: Oct. 9, 2020

(65) Prior Publication Data

US 2021/0112205 A1 Apr. 15, 2021

(30) Foreign Application Priority Data

Oct. 10, 2019 (JP) .............................. JP2019-187072

(51) Int. Cl.
*H04N 5/232* (2006.01)

(52) U.S. Cl.
CPC .............................. *H04N 5/232122* (2018.08)

(58) Field of Classification Search
CPC ...................... H04N 5/232122; H04N 5/36961
See application file for complete search history.

(56) References Cited

U.S. PATENT DOCUMENTS

| 6,512,549 | B1* | 1/2003 | Iijima | .............. | H04N 5/232123 |
| | | | | | 348/E5.045 |
| 2007/0196029 | A1* | 8/2007 | Kondo | ...................... | G06T 1/00 |
| | | | | | 382/274 |
| 2015/0195446 | A1* | 7/2015 | Saito | ................ | H04N 5/232122 |
| | | | | | 348/353 |
| 2019/0191100 | A1* | 6/2019 | Nakamura | ....... | H04N 5/232127 |

FOREIGN PATENT DOCUMENTS

| JP | 2012-027390 A | 2/2012 |
| JP | 2014-106476 A | 6/2014 |

* cited by examiner

*Primary Examiner* — Gevell V Selby
(74) *Attorney, Agent, or Firm* — Cowan, Liebowitz & Latman, P.C.

(57) ABSTRACT

A focus detection apparatus comprises a determination unit that determines whether a first signal output from an image sensor satisfies a predetermined condition, and outputs first information indicating a result of the determination, a calculation unit that performs filter processing on a plurality of the first signals using predetermined coefficients at a predetermined cycle and outputs a second signal, a generation unit that generates second information showing an effect of the first signal which satisfies the predetermined condition on the second signal using the coefficients and plural pieces of the first information corresponding to the plurality of the first signals used in the filter processing, and a focus detection unit that detects a focus state based on a plurality of the second signals and the second information.

19 Claims, 8 Drawing Sheets

FOCUS DETECTION APPARATUS AND METHOD, AND IMAGE CAPTURING APPARATUS

BACKGROUND OF THE INVENTION

Field of the Invention

The present invention relates to a focus detection apparatus and method, and an image capturing apparatus, and more particularly, to a focus detection apparatus and method, and an image capturing apparatus that perform focus adjustment on a subject using a phase difference detection method.

Description of the Related Art

Conventionally, there is an image capturing apparatus which uses a two-dimensional image sensor having a plurality of pixels each of which is formed with one microlens and a plurality of photoelectric conversion units. The plurality of photoelectric conversion units are configured so as to receive light that has passed through different regions of the exit pupil of the photographing lens via one microlens, thereby pupil division is realized. A pair of focus detection signals having parallax are read out from the pixel having the plurality of photoelectric conversion units and, by adding the read pair of focus detection signals, it is possible to obtain an image signal for recording. Alternatively, by reading one of the pair of focus detection signals and an image signal added for each pixel and subtracting the focus detection signal from the image signal, the other focus detection signal can be obtained. The phase difference focus detection can be performed by calculating a correlation amount of the pair of focus detection signals acquired in this way and obtaining an image shift amount from the calculated correlation amount.

Further, Japanese Patent Laid-Open No. 2012-027390 discloses that if some pixel signals of an image signal for focus adjustment have an abnormal signal level, those pixel signals are not used for detecting a phase difference, thereby improving the accuracy of the focus adjustment function in the phase difference method.

In recent years, the number of pixels of an image sensor has increased, and phase difference detection processing takes time. Therefore, it is conceivable to perform pixel addition or reduction processing to reduce the number of pixels to be handled. However, in a case where signals from a plurality of pixels that are referred to when performing pixel addition or reduction processing include even one signal having an abnormal signal level, signal levels after pixel addition or reduction processing deviate from the signal levels that should be. Therefore, a pixel having an abnormal signal level must be treated as such. However, as a reference range to be referred to when performing the pixel addition or reduction processing becomes wider, the number of pixels which should be treated as pixels having an abnormal signal level increases after the pixel addition or reduction processing, which may cause a problem in the accuracy of the phase difference detection processing.

SUMMARY OF THE INVENTION

The present invention has been made in consideration of the above situation, and suppresses the deterioration of the accuracy of the phase difference detection processing while shortening the time taken for the focus detection process.

According to the present invention, provided is a focus detection apparatus comprising: a determination unit that determines whether a first signal output from an image sensor satisfies a predetermined condition, and outputs first information indicating a result of the determination, wherein the image sensor has a plurality of microlenses and photoelectric conversion units, each of the microlenses corresponding to a plurality of the photoelectric conversion units; a calculation unit that performs filter processing on a plurality of the first signals using predetermined coefficients at a predetermined cycle and outputs a second signal; a generation unit that generates second information showing an effect of the first signal which satisfies the predetermined condition on the second signal using the coefficients and plural pieces of the first information corresponding to the plurality of the first signals used in the filter processing; and a focus detection unit that detects a focus state based on a plurality of the second signals and the second information, wherein each unit is implemented by one or more processors, circuitry or a combination thereof.

Further, according to the present invention, provided is an image capturing apparatus comprising: an image sensor which has a plurality of microlenses and photoelectric conversion units, each of the microlenses corresponding to a plurality of the photoelectric conversion units; and a focus detection apparatus including: a determination unit that determines whether a first signal output from the image sensor satisfies a predetermined condition, and outputs first information indicating a result of the determination; a calculation unit that performs filter processing on a plurality of the first signals using predetermined coefficients at a predetermined cycle and outputs a second signal; a generation unit that generates second information showing an effect of the first signal which satisfies the predetermined condition on the second signal using the coefficients and plural pieces of the first information corresponding to the plurality of the first signals used in the filter processing; and a focus detection unit that detects a focus state based on a plurality of the second signals and the second information, wherein each unit is implemented by one or more processors, circuitry or a combination thereof.

Furthermore, according to the present invention, provided is a focus detection method comprising: determining whether a first signal output from an image sensor satisfies a predetermined condition, and outputting first information indicating a result of the determination, wherein the image sensor has a plurality of microlenses and photoelectric conversion units, each of the microlenses corresponding to a plurality of the photoelectric conversion units; performing filter processing on a plurality of the first signals using predetermined coefficients at a predetermined cycle and outputting a second signal; generating second information showing an effect of the first signal which satisfies the predetermined condition on the second signal using the coefficients and plural pieces of the first information corresponding to the plurality of the first signals used in the filter processing; and detecting a focus state based on a plurality of the second signals and the second information.

Further, according to the present invention, provided is a non-transitory computer-readable storage medium, the storage medium storing a program that is executable by the computer, wherein the program includes program code for causing the computer to function as a focus detection apparatus which comprises: a determination unit that determines whether a first signal output from an image sensor satisfies a predetermined condition, and outputs first information indicating a result of the determination, wherein the image sensor has a plurality of microlenses and photoelectric conversion units, each of the microlenses corresponding to a plurality of the photoelectric conversion units; a calculation unit that performs filter processing on a plurality of the first signals using predetermined coefficients at a predetermined cycle and outputs a second signal; a generation unit that generates second information showing an effect of the first signal which satisfies the predetermined condition on the second signal using the coefficients and plural pieces of the first information corresponding to the plurality of the first signals used in the filter processing; and a focus detection unit that detects a focus state based on a plurality of the second signals and the second information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
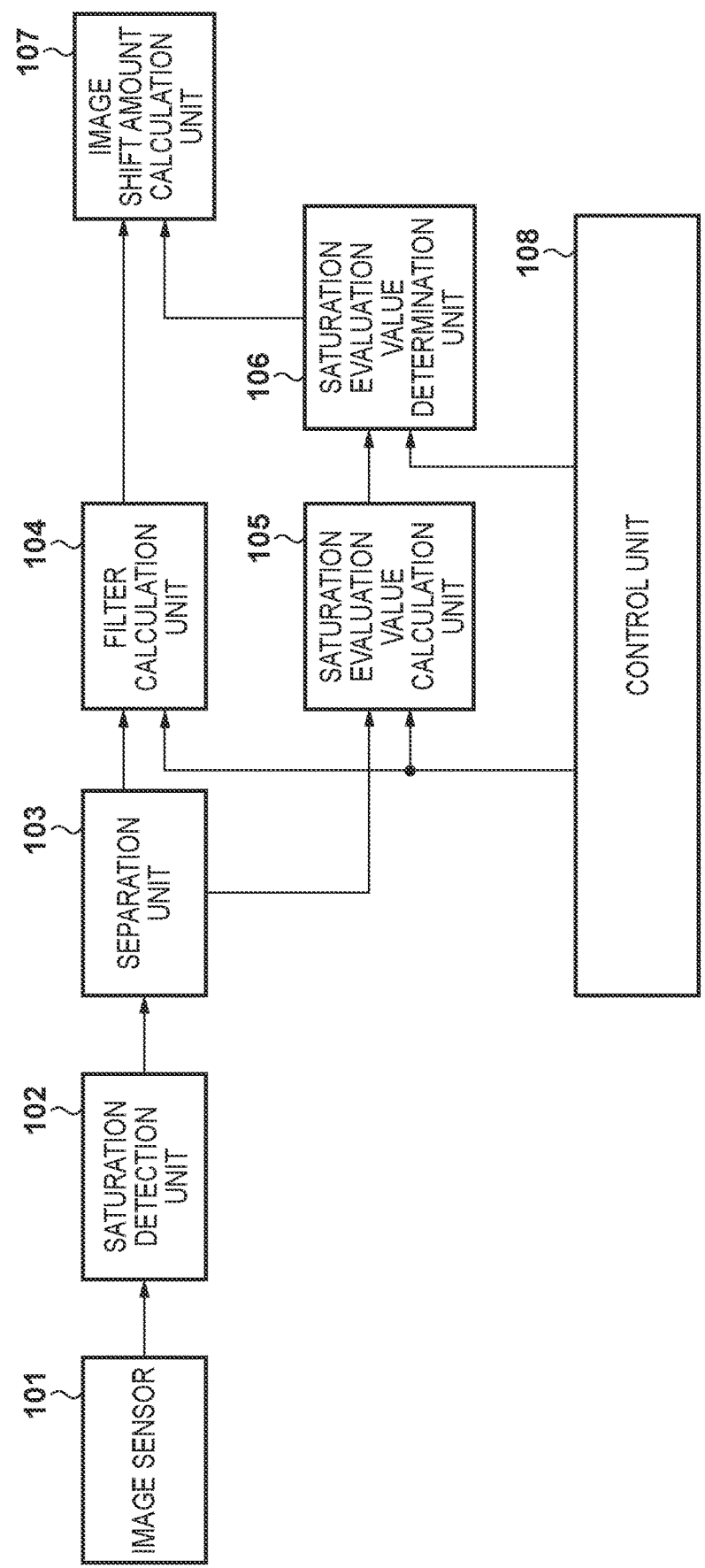
FIG. 1 is a block diagram showing a schematic configuration of an image capturing apparatus according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Hereinafter, a first embodiment of the present invention will be described. FIG. 1 is a block diagram showing a schematic configuration of the image capturing apparatus according to the first embodiment, and only the constituents necessary for the present embodiment are shown.

Figure 2:
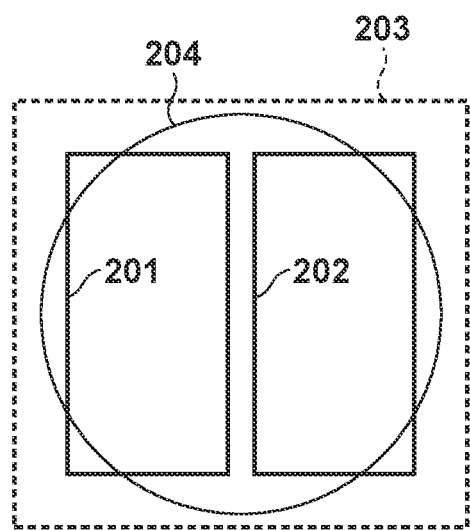
FIG. 2 is a plan view showing a configuration example of a pixel according to the first embodiment.

An image sensor 101 has a configuration in which a plurality of pixels each having one microlens and a plurality of photoelectric conversion units are two-dimensionally arranged. As an example, FIG. 2 is a plan view showing the structure of one pixel 203 having two photoelectric conversion units 201 and 202 and one microlens 204 covering the two photoelectric conversion units 201 and 202. With this structure, the photoelectric conversion units 201 and 202 of each pixel 203 receive, via the microlens 204, the light flux that has passed through different exit pupil regions of an imaging optical system (not shown). Each photoelectric conversion unit converts the received light flux into an electric signal by photoelectric conversion and outputs the electric signal.

Then, by individually reading out the signals from the photoelectric conversion units 201 and 202, a pair of signals (focus detection signals) having parallax that can be used for phase difference focus detection can be acquired. Further, by adding the pair of acquired focus detection signals for each pixel 203, it is possible to obtain a signal (image signal) to be displayed or recorded in the image capturing apparatus.

Alternatively, the focus detection signal may be read out from one of the photoelectric conversion units 201 and 202, and then the image signal may be read out after adding the signals from the photoelectric conversion units 201 and 202 corresponding to each microlens 204. In that case, a pair of focus detection signals can be obtained by subtracting the focus detection signal from the image signal.

In the processing described below, the image signal and the focus detection signal are processed in the same manner, and thus the image signal and the focus detection signal are both referred to as an "readout signal" without distinguishing between them.

A saturation detection unit 102 detects a saturated readout signal among the readout signals output from the image sensor 101. Here, if the signal level of the readout signal is equal to or higher than a predetermined value (i.e., if a predetermined condition is satisfied), it is considered that the readout signal is saturated, and saturation information from which the saturation can be identified in the subsequent processing is generated. In addition, in this embodiment, the saturation information is binary information, and is 1 if saturated and 0 if not saturated. Then, the generated saturation information is output together with the readout signal.

Figure 3:
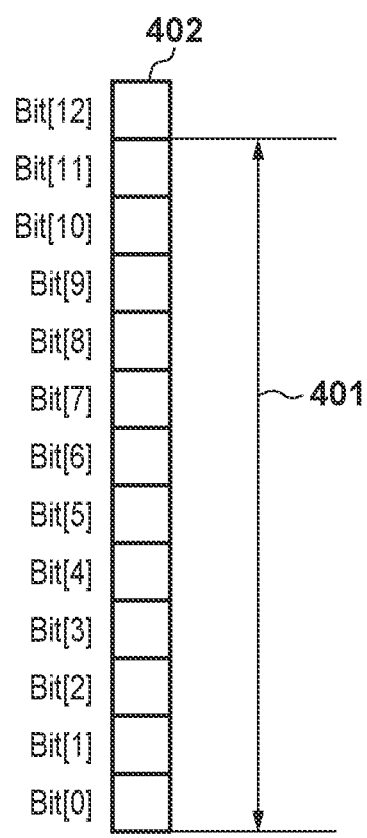
FIG. 3 is a diagram schematically showing a data format of a readout signal for one pixel according to the first embodiment.

FIG. 3 schematically shows the data format of the readout signal for one pixel to which the saturation information is added. The readout signal obtained from the image sensor 101 is output as digital data so as to be easily handed in the image capturing apparatus, and is represented by a predetermined number of bits per pixel. In the present embodiment, description will be made assuming that the readout data is 12-bit data per pixel. In FIG. 3, a digitized signal value of one pixel is stored in a bit string 401 of 12 bits in total, and saturation information is stored in another bit 402 added to the 12-bit signal value.

A separation unit 103 separates the data output from the saturation detection unit 102 into a readout signal and saturation information, and outputs the readout signal to a filter calculation unit 104 and the saturation information to a saturation evaluation value calculation unit 105.

The filter calculation unit 104 performs filter processing on the readout signal output from the separation unit 103 using filter coefficients sent from a control unit 108.

Figure 4:
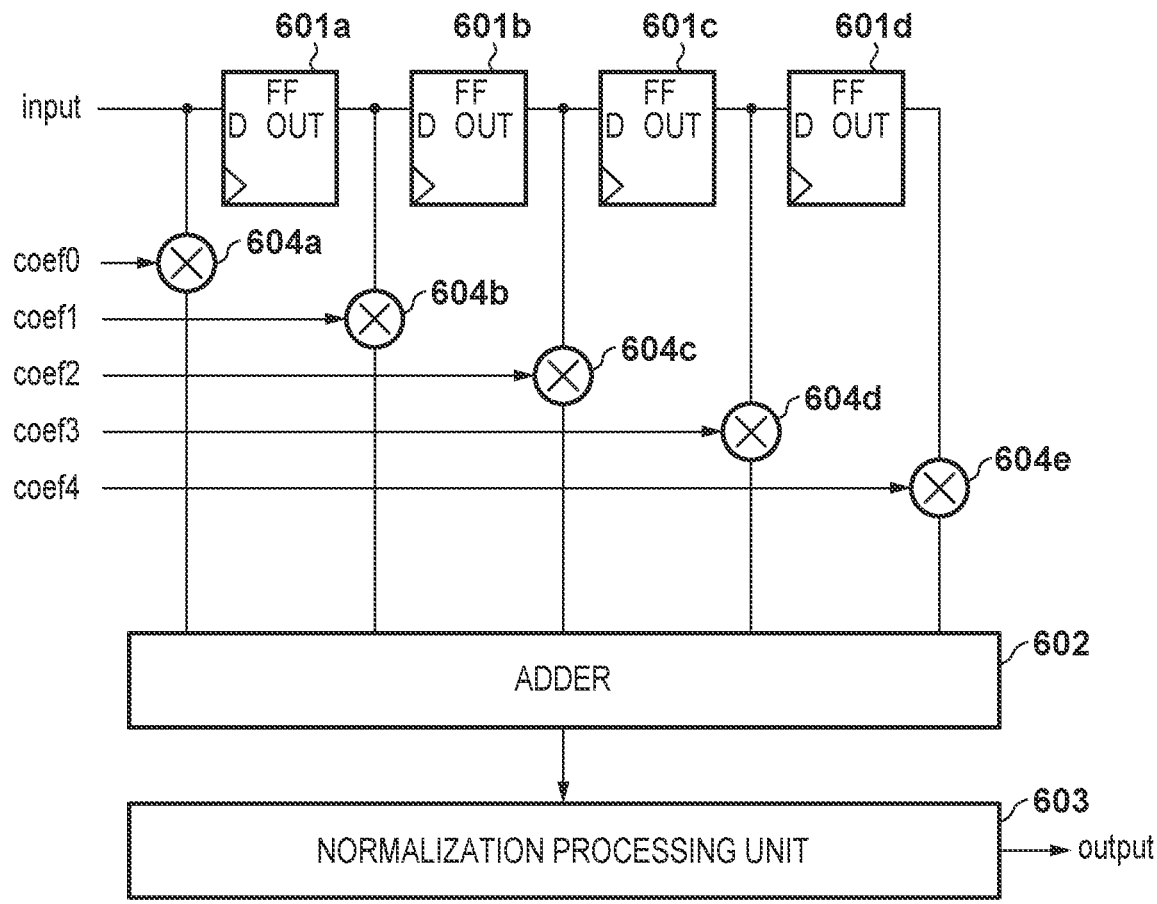
FIG. 4 is a block diagram showing a schematic configuration of a filter calculation unit according to the first embodiment.

FIG. 4 is a diagram showing a circuit configuration example of the filter calculation unit 104. The readout signal is input from an input terminal, and the readout signal and four readout signals delayed by delay elements 601a to 601d are multiplied by filter coefficients coef0 to coef4 in multipliers 604a to 604e, respectively. The products output from the multipliers 604a to 604e are added by an adder 602, normalized by a normalization processing unit 603, and output from an output terminal. The filter calculation unit 104 performs the above-described filter processing (weighted addition processing) at a predetermined cycle, and the calculation result is output from the output terminal at the cycle. Note that, by resampling the output signal value as necessary, the deterioration of the spatial frequency characteristics of the readout signals can be minimized and the number of pixels of the readout signals can be reduced. For the purpose of reducing the number of pixels, a low-pass filter is used in order to suppress aliasing (folding distortion) due to resampling.

Note that the configuration of the filter calculation unit 104 is not limited to that shown in FIG. 4, and may have any circuit configuration as long as it can realize the calculation shown in Expression (1).

$$P'_i = \frac{1}{N} \sum_{m=-2}^{+2} (C_{m+2} \cdot P_{m+i}), \text{ where } N = \sum_{m=-2}^{+2} C_{m+2} \quad (1)$$

Expression (1), "C" indicates a filter coefficient.

Figure 5:
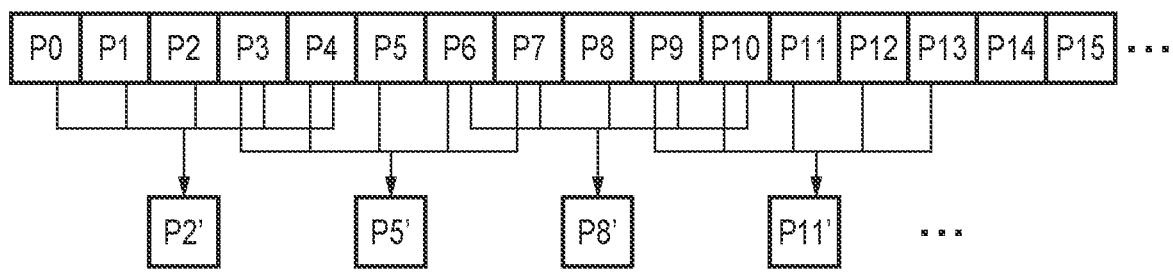
FIG. 5 is a conceptual diagram showing a filter calculation process of a readout signal according to the first embodiment.

FIG. 5 schematically shows some of the readout signals for one row that are subjected to the filter processing by the filter calculation unit 104 in a 3-pixel cycle (predetermined cycle) as an example, and P0 to P15 represent the readout signals of respective pixels. Further, P2' represents the readout signal after the filter processing, and corresponds to the pixel position of the readout signal P2 before the filter processing. The readout signal P2' is calculated by the filter calculation unit 104 having the configuration shown in FIG. 4 using the readout signals P0, P1, P2, P3, P4 of 5 pixels and the filter coefficients sent from the control unit 108, as described above. Similarly, the read out signal P5' corresponds to the pixel position of the read out signal P5 before the filter processing, and is calculated using the readout signals P3, P4, P5, P6, P7 of 5 pixels and the filter coefficients. The readout signals P8' and P11' correspond to the pixel positions of the readout signals P8 and P11 before the filter processing, respectively, and are calculated using the readout signals of 5 pixels and the filter coefficients.

The saturation evaluation value calculation unit 105 calculates a saturation evaluation value using the saturation information output from the separation unit 103 and the filter coefficients sent from the control unit 108. The filter coefficients used here are the same as the filter coefficients used in the filter calculation unit 104 described above. Further, the saturation evaluation value calculation unit 105 performs weighted addition processing similar to the filter processing by the filter calculation unit 104.

Figure 6:
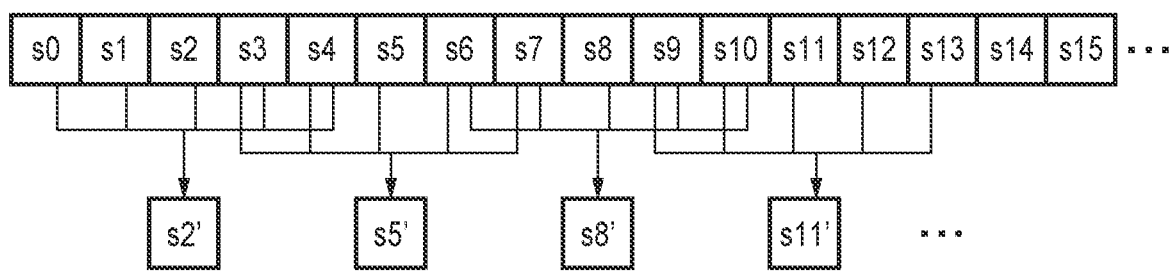
FIG. 6 is a conceptual diagram showing a calculation process of saturation information according to the first embodiment.

FIG. 6 schematically shows some pieces of the saturation information for one row to be processed by the saturation evaluation value calculation unit 105, where s0 to s15 represent the saturation information corresponding to the readout signals P0 to P15, respectively. Further, s2' represents a saturation evaluation value corresponding to the readout signal P2'. The saturation evaluation value s2' is calculated using five pieces of the saturation information s0, s1, s2, s3, s4 and the filter coefficients sent from the control unit 108. Similarly, the saturation evaluation value s5' is calculated using five pieces of the saturation information s3, s4, s5, s6, s7 and the filter coefficients, and corresponds to the readout signal P5'. Also, saturation evaluation values s8' and s11' are calculated using five pieces of the saturation information and the filter coefficients, respectively, and correspond to the readout signals P8' and P11', respectively. The formula for calculating the saturation evaluation value used in the saturation evaluation value calculation unit 105 is shown in Expression (2).

$$s'_i = \frac{1}{N} \sum_{m=-2}^{+2} (C_{m+2} \cdot s_{m+i}), \text{ where } N = \sum_{m=-2}^{+2} C_{m+2} \quad (2)$$

In Expression (2), "C" indicates a filter coefficient. The saturation evaluation value calculation unit 105 performs on the saturation information the same numerical processing as the filter processing performed on the readout signals in the filter calculation unit 104, as will be understood by comparing Expression (2) with Expression (1).

A saturation evaluation value determination unit 106 compares the saturation evaluation value output from the saturation evaluation value calculation unit 105 with a threshold value sent from the control unit 108, determines whether or not the saturation is occurring, and generates new saturation information. For example, the saturation evaluation value determination unit 106 determines that the saturation is occurring if the saturation evaluation value is larger than the threshold value, and determines that the saturation is not occurring if the saturation evaluation value is equal to or less than the threshold value, and outputs information on the determined result to an image shift amount calculation unit 107.

The image shift amount calculation unit 107 acquires a pair of filter-processed focus detection signals from the readout signals which have undergone the filter processing and are output from the filter calculation unit 104, and calculates a shift amount (image shift amount). This image shift amount indicates the focus state. At that time, new saturation information output from the saturation evaluation value determination unit 106 is used. As a method for obtaining the image shift amount when a saturated pixel exists, various methods have been proposed in the past, such as the method disclosed in Japanese Patent Laid-Open No. 2014-106476 by the applicant of the present invention, and any of those method may be used. In other words, the present invention is not limited by the method of calculating the image shift amount.

As described above, the control unit 108 sends the filter coefficients to the filter calculation unit 104 and the saturation evaluation value calculation unit 105, and sends the threshold value used for the determination process to the saturation evaluation value determination unit 106. In addition, the control unit 108 controls the entire image capturing apparatus.

Figure 7:
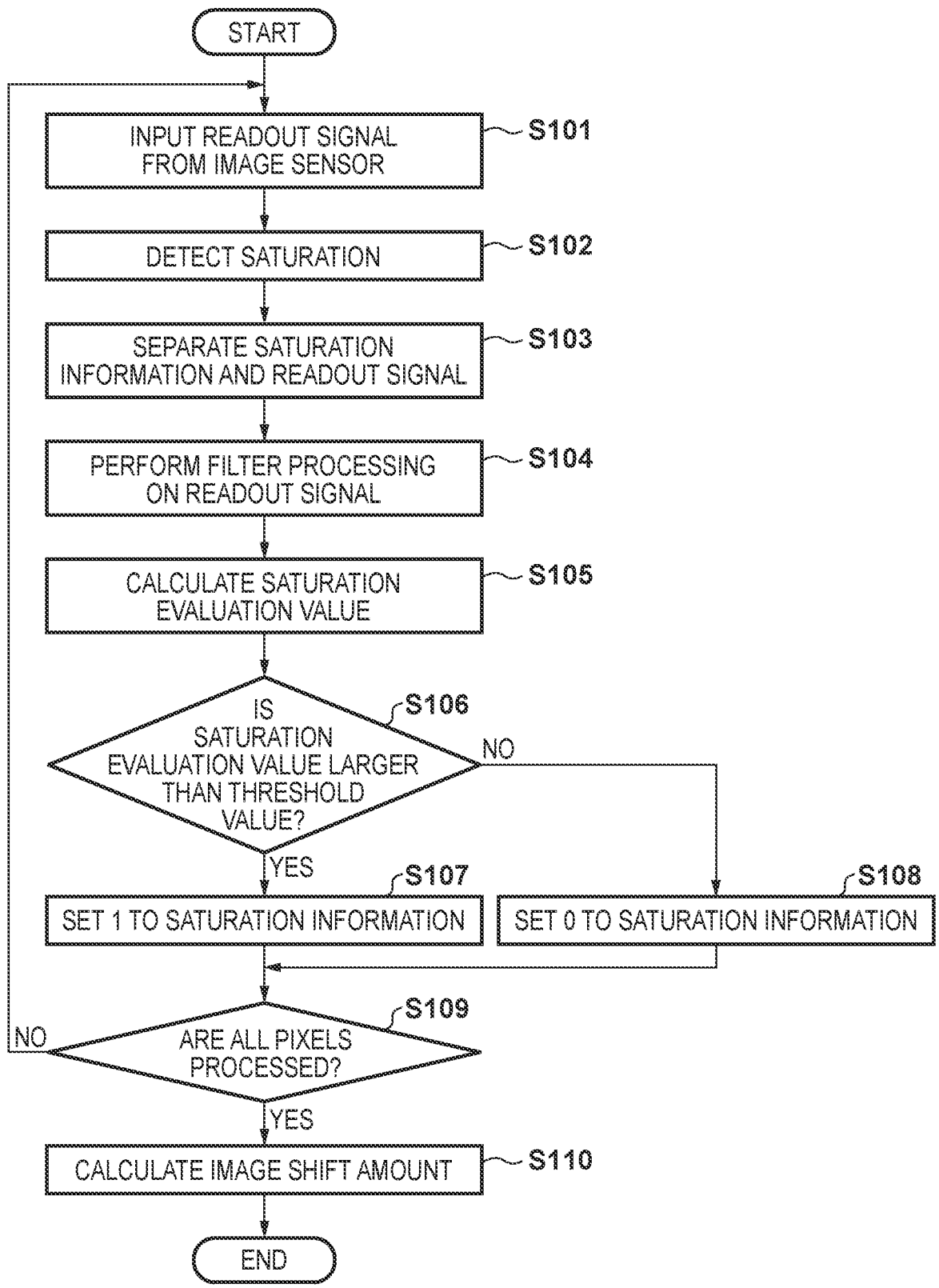
FIG. 7 is a flowchart showing focus detection processing according to the first embodiment.

Next, the processing in this embodiment will be described with reference to FIG. 7.

First, in step S101, a signal is read out from the image sensor 101. In this case, the readout signal may be a focus detection signal or an image signal as described above.

Next, in step S102, the saturation detection unit 102 detects saturation information from the readout signal obtained from the image sensor 101, adds the saturation information to the readout signal, and outputs it.

In step S103, the separation unit 103 extracts the saturation information from the readout signal to which the saturation information is added and outputs it to the saturation evaluation value calculation unit 105. Similarly, the separation unit 103 extracts the readout signal from the readout signal to which the saturation information is added and output it to the filter calculation unit 104. Specifically, by separating the data bit by bit based on the format of one pixel shown in FIG. 3 and outputting them to different systems, the readout signal and the saturation information are separated while maintaining the pixel position information on the image sensor 101.

In step S104, the filter calculation unit 104 performs digital filter processing on the readout signal output from the separation unit 103, and outputs the filter-processed readout signal.

In step S105, the saturation evaluation value calculation unit 105 calculates a saturation evaluation value based on the saturation information output from the separation unit 103 and the filter coefficients output from the control unit 108.

In step S106, the saturation evaluation value determination unit 106 compares the saturation evaluation value output from the saturation evaluation value calculation unit 105 with the threshold value output from the control unit 108. If the saturation evaluation value is larger than the threshold value, the process proceeds to step S107, and if the saturation evaluation value is equal to or less than the threshold value, the process proceeds to step S108.

If the saturation evaluation value is larger than the threshold value, the saturation evaluation value determination unit 106 sets 1 as new saturation information in step S107, and outputs the saturation information (1) to the image shift amount calculation unit 107. On the other hand, if the saturation evaluation value is equal to or less than the threshold value, the saturation evaluation value determination unit 106 sets 0 as new saturation information in step S108 and outputs the saturation information (0) to the image shift amount calculation unit 107.

The processes of steps S104 to S108 are performed at a predetermined cycle as described above. For example, in the example of the filter processing shown in FIG. 5, it is performed in a 3-pixel cycle (predetermined cycle).

In step S109, it is determined whether or not the above-described processes have been performed on all the pixels of the image sensor 101, and if they have been performed on all the pixels, the process proceeds to step S110, whereas if there is an unprocessed pixel, the process returns to step S101 and the above-described processes are repeated.

In step S110, the image shift amount calculation unit 107 performs correlation calculation using the filter-processed readout signals (focus detection signals) output from the filter calculation unit 104 and the new saturation information output from the saturation evaluation value determination unit 106, and calculates an image shift amount from the correlation calculation result.

As described above, according to the first embodiment, the following effects can be obtained. That is, in a case where the number of pixels (readout signals) is reduced by using the filter processing in order to shorten the processing time of the phase difference detection processing when the number of pixels read out from the image sensor 101 is large, the same coefficients as the filter coefficients are used to weight the saturation information for calculating an evaluation value. Then, by comparing the calculated evaluation value with a threshold value, it is determined whether or not to handle the readout signal obtained though the filter processing as a saturated signal. As a result, it is possible to evaluate the saturation information in consideration of the contribution rate of the readout signals before the filter processing to the readout signals after the filter processing due to the filter coefficients. For example, in a case where the contribution rate of the saturated readout signal is low and the saturation evaluation value is low, it is possible not to treat the filter-processed readout signal as a saturated pixel. As a result, a larger number of filter-processed readout signals can be used for calculating the image shift amount, so that the accuracy of the phase difference focus adjustment function can be improved.

In addition, by changing the threshold value for determining the saturation evaluation value used in the saturation evaluation value determination unit 106 according to the image height of the subject image from the optical axis center of an optical system (not shown), it is possible to the adaptively determine the saturation evaluation value.

Figure 8:
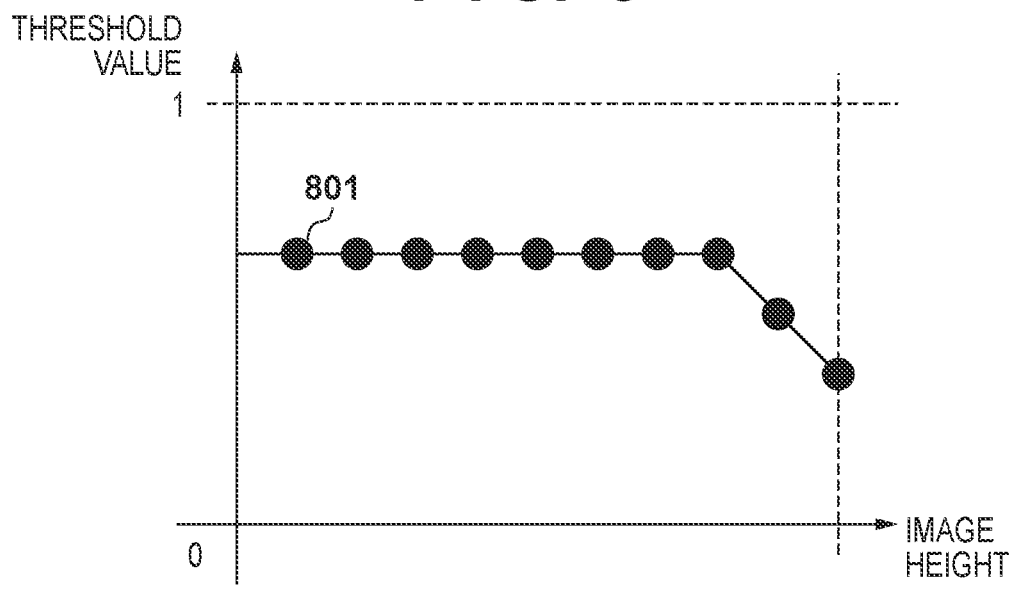
FIG. 8 is a graph showing a relationship between an image height and a threshold value used in saturation evaluation value determination according to the first embodiment.

FIG. 8 schematically shows the threshold values used in the determination of saturation evaluation value with respect to the image heights, and as shown by the black dots 801, they are held in the control unit 108 as discrete data, for example. It is known that, in a region of the image sensor 101 where the image height is high, the light flux reaching the region is reduced due to characteristics of an imaging optical system (not shown) or a member (lens barrel or the like) constituting an optical system. In that case, since the signal level of a readout signal output from the region where the image height is high is relatively low comparing to the signal level of a readout signal output from the region near the optical axis, the influence of the saturated pixel becomes relatively large. Therefore, in the saturation evaluation value determination unit 106, by changing the threshold value for determining the evaluation value according to the image height, it is possible to perform appropriate saturation evaluation suitable for each region of the image sensor 101.

Further, the threshold value for determining the saturation evaluation value may be changed according to the output result of the filter calculation unit 104 so that the saturation evaluation value is adaptively determined.

Figure 9:
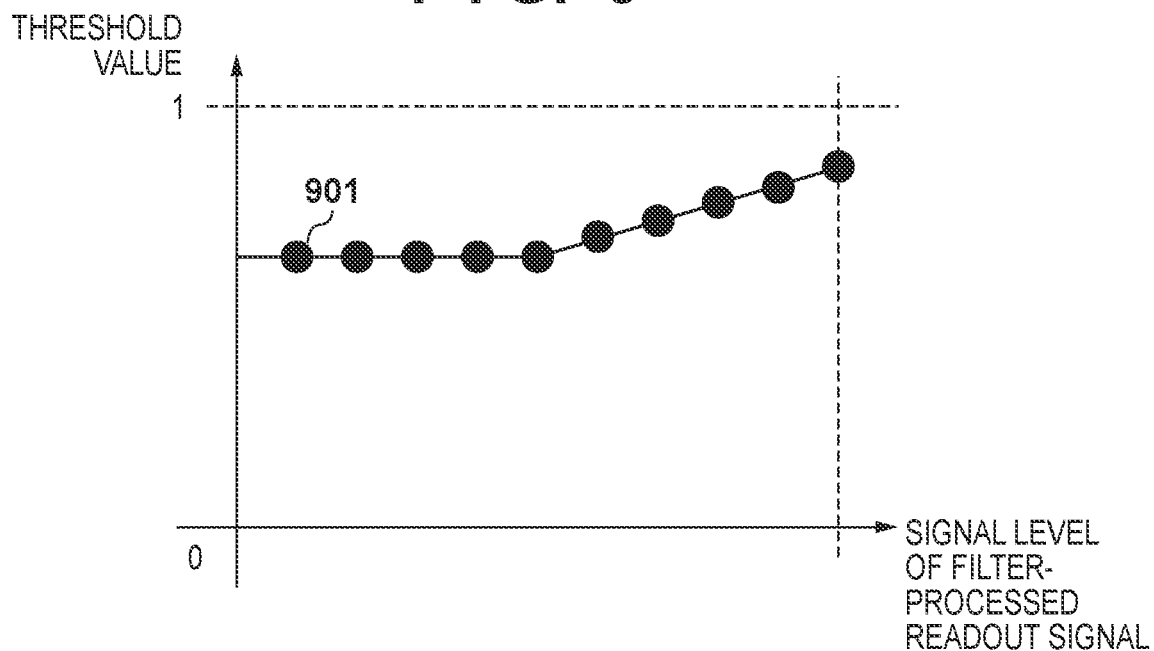
FIG. 9 is a graph showing a relationship between a readout signal level after filter processing and a threshold value according to the first embodiment.

FIG. 9 schematically shows the threshold values with respect to the signal levels of readout signals after the filter processing is performed by the filter calculation unit 104, and as shown by black dots 901, they are held in the control unit 108 as discrete data, for example. In a region where the signal levels of the filter-processed readout signals is high, the average signal level of the referenced readout signals tends to be high, so the effect of saturated pixels is relatively small compared to a region where the signal levels of the filter-processed readout signals is small. Therefore, by changing the threshold value for determining the evaluation value according to the signal levels of the filter-processed readout signals in the saturation evaluation value determination unit 106, it is possible to perform appropriate saturation evaluation suitable for the brightness of the subject image.

As for the discrete data shown in FIGS. 8 and 9, the relationship between the image height and the threshold value may be mathematically expressed and stored in the control unit 108.

Second Embodiment

Figure 10:
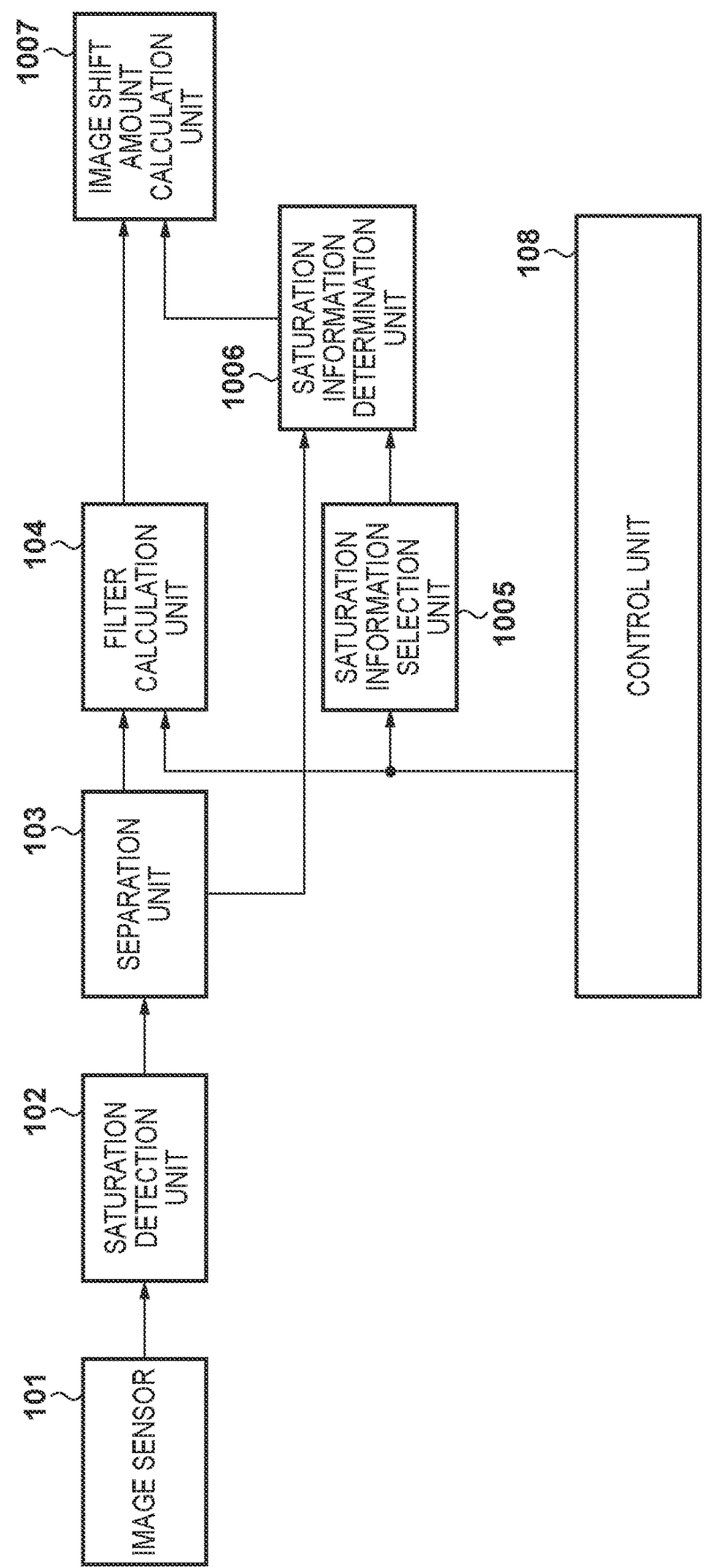
FIG. 10 is a block diagram showing a schematic configuration of an image capturing apparatus according to a second embodiment.

Next, a second embodiment of the present invention will be described with reference to the drawings. FIG. 10 is a block diagram showing the configuration of an image capturing apparatus according to the second embodiment. In FIG. 10, the same components as those shown in FIG. 1 are designated by the same reference numerals, and the description thereof will be omitted as appropriate.

In FIG. 10, a saturation information selection unit 1005 selects at least some of plural pieces of the saturation information output from the separation unit 103 based on the filter coefficients sent from the control unit 108. Note that the filter coefficients sent from the control unit 108 here are the same as the filter coefficients sent to the filter calculation unit 104. A saturation information determination unit 1006 selects at least some of plural pieces of the saturation information sent from the separation unit 103 based on the selection information output from the saturation information selection unit 1005, and generates new saturation information based on the selected pieces of the saturation information. An image shift amount calculation unit 1007 calculates the shift amount of the readout signals using the filter-processed readout signals output from the filter calculation unit 104 and the new saturation information output from the saturation information determination unit 1006, thereby the phase difference detection processing is performed.

Figure 11:
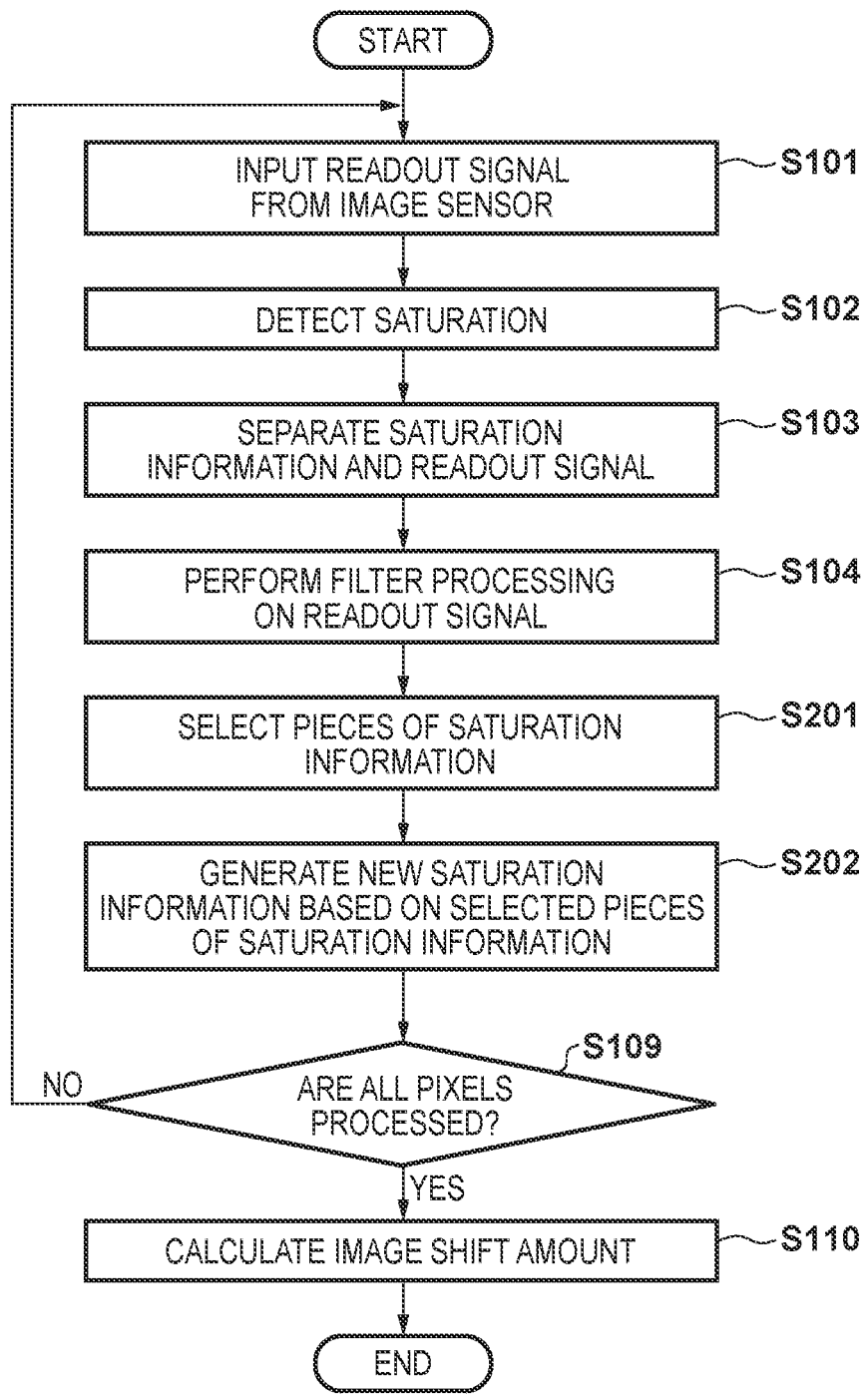
FIG. 11 is a flowchart showing focus detection processing according to the second embodiment.

Next, the processing in this embodiment will be described with reference to FIG. 11. Note that the same step numbers are given to the same processes as the processes in FIG. 7 of the first embodiment, and description thereof will be omitted.

In step S201, the saturation information selection unit 1005 selects at least some of the plural pieces of the saturation information output from the separation unit 103 based on the filter coefficients output from the control unit 108.

In a case where five filter coefficients are used in the filter calculation unit 104 as shown in Expression (1) as in the present embodiment, the saturation information selection unit 1005 selects pieces of the saturation information of pixel positions corresponding to the three largest coefficients, for example, among the five filter coefficients. Note that the number of pieces of the saturation information to be selected is not limited to three and may be within the number of filter coefficients. The smaller the filter coefficient is, the smaller the contribution rate of the corresponding readout signal to the calculation result in the filter calculation unit 104 becomes. Therefore, the selection is made so as to exclude the saturation information having a small contribution rate.

In step S202, the saturation information determination unit 1006 generates new saturation information based on the selection information output from the saturation information selection unit 1005 and the saturation information output from the separation unit 103. If the saturation information selection unit 1005 has selected one piece of the saturation information, the selected piece of the saturation information is output as new saturation information as it is. If the saturation information selection unit 1005 selects plural pieces of the saturation information, the number of pieces of the saturation information holding the value 1 and the number of pieces of the saturation information holding the value 0 are counted, and the saturation information of the larger number is output as new saturation information. As a result, in a case where the number of pieces of the saturation information holding the value 1 is smaller than that holding the value 0, it is possible to use the filter-processed readout signal corresponding to the saturation information having the value 1 for calculating the image shift amount in the image shift amount calculation unit 1007. Alternatively, a logical sum of the pieces of selected saturation information may be calculated and the calculation result may be output as new saturation information. Alternatively, in a case where the number of selected pieces of the saturation information having the value 1 exceeds a predetermined number, 1 may be output as new saturation information.

Figure 12:
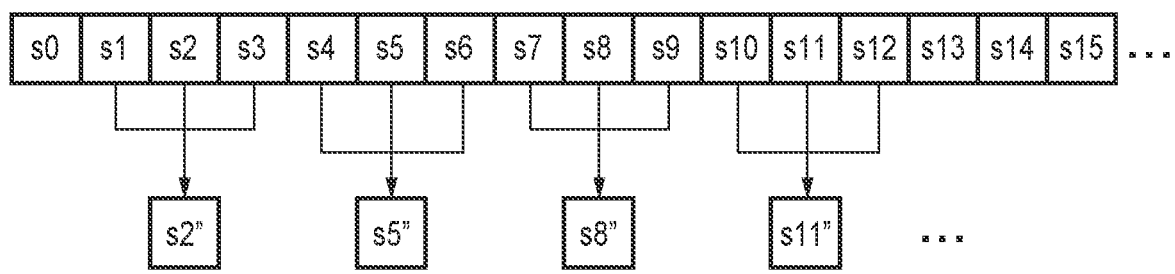
FIG. 12 is a conceptual diagram showing a calculation process of saturation information according to the second embodiment.

FIG. 12 schematically shows some of the pieces of the saturation information for one line and the new saturation information output from the saturation information determination unit 1006 in a case where the filter processing is performed in a 3-pixel cycle (predetermined cycle). As an example, a case is shown in which pieces of the saturation information corresponding to the three largest filter coefficients out of five filter coefficients are selected. In FIG. 12, s2" represents the saturation information corresponding to the readout signal P2'. Similarly, s5", s8", and s11" represent the saturation information corresponding to the readout signals P5', P8', and P11', respectively.

The processes of steps S104 to S202 are performed at a predetermined cycle as described above. For example, in the example of the filter processing shown in FIG. 5, the filter processing is performed in a 3-pixel cycle (predetermined cycle).

In step S109, it is determined whether or not the above-described processes have been performed on all the pixels of the image sensor 101, and if they have been performed on all the pixels, the process proceeds to step S110, whereas if there is an unprocessed pixel, the process returns to step S101 and the above-described processes are repeated.

In step S110, the image shift amount calculation unit 1007 performs correlation calculation using the filter-processed readout signals (focus detection signals) output from the filter calculation unit 104 and the new saturation information output from the saturation information determination unit 1006, and calculate an image shift amount from the correlation calculation result. By using the new saturation information for determining whether to use the result of the correlation calculation for calculating the image shift amount, the accuracy of calculation of the image shift amount can be improved.

As described above, according to the second embodiment, some of the plural pieces of the saturation information is selected based on the same coefficients as the filter coefficients used in the filter processing, and a new saturation information is generated based on the selected pieces of the saturation information. As a result, it becomes possible to perform evaluation in consideration of the contribution rate of the input signal to the output signal due to the filter coefficients used in the filter processing. For example, when the contribution rate is low and the saturation evaluation value is low, it is possible not to treat the readout signal as of a saturated pixel, and the filter-processed readout signal can be used in calculating the image shift amount. Accordingly, it is possible to improve the accuracy of the focus adjustment function.

Further, the selection information by the saturation information selection unit 1005 may be changed according to the image height of the subject image from the optical axis center of an optical system (not shown). It is known that, in a region of the image sensor 101 where the image height is high, the light flux reaching the region is reduced due to characteristics of an imaging optical system (not shown) or a member (lens barrel or the like) constituting an optical system. In that case, since the signal level of a readout signal output from a pixel in the region where the image height is high is relatively low comparing to the signal level of a readout signal output from a pixel in the region near the optical axis, the influence of the saturated pixel becomes relatively large. Accordingly, if the image height of the region is high, the saturation information selection unit 1005 select less number of pieces of the saturation information, thereby it is possible to reduce the influence of the saturation information and to generate new saturation information suitable for each region in the image sensor 101.

Further, the selection information by the saturation information selection unit 1005 may be changed according to the output result of the filter calculation unit 104. In a region where the signal levels of the readout signals after filter processing is high, the average signal level of the referenced readout signal tends to be high, so the effect of saturated pixels is relatively small compared to a region where the signal level of the readout signal after filter processing is small. Therefore, in the saturation information selection unit 1005, by selecting pieces of the saturation information according to the signal level of the filter-processed readout signal, it is possible to generate the appropriate saturation information suitable for the brightness of the subject image.

In addition, in the above-described first and second embodiments, the case of detecting a saturated readout signal has been described, but the present invention is not limited to this, and for example, a readout signal of a defective pixel due to a manufacturing error or deterioration over time may be detected. Thus, in addition to the saturated readout signal, a readout signal that does not correspond to the amount of incident light may be detected.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-187072, filed on Oct. 10, 2019 which is hereby incorporated by reference herein in its entirety.

What is claimed is:

1. A focus detection apparatus comprising:
a determination unit that determines whether each of first signals output from an image sensor satisfies a predetermined condition, and outputs first information indicating a result of the determination, wherein the image sensor has a plurality of microlenses and photoelectric conversion units, each of the microlenses corresponding to a plurality of the photoelectric conversion units;
a calculation unit that performs filter processing on the first signals using predetermined coefficients at a predetermined cycle for reducing the number of the first signals and outputs second signals;
a generation unit that generates second information showing an effect of the first signals which satisfies the predetermined condition on the second signals using the coefficients and plural pieces of the first information corresponding to the plurality of the first signals used in the filter processing, wherein each piece of the second information corresponds to each of the second signals; and
a focus detection unit that detects a focus state based on a plurality of the second signals and the second information,
wherein each unit is implemented by one or more processors, circuitry or a combination thereof.

2. The focus detection apparatus according to claim 1, wherein the predetermined condition includes at least one of a state in which the first signals are saturated and a state in which the first signals do not correspond to an amount of light incident on the photoelectric conversion unit.

3. The focus detection apparatus according to claim 1, wherein the first information is binary information indicative of the result of the determination, and the generation unit performs weighted addition on the plural pieces of the first information using the coefficients, and compares the obtained value with a predetermined threshold to generate the second information.

4. The focus detection apparatus according to claim 1, wherein, if the first information is set to 1 in a case where the condition is satisfied and if the first information is set to 0 in a case where the condition is not satisfied, the generation unit sets 1 to the second information if the value obtained by the weight addition is greater than the threshold, and sets 0 if the value is equals to or less than the threshold.

5. The focus detection apparatus according to claim 3, wherein the threshold is changed in accordance with image height of the photoelectric conversion unit that output the first signals.

6. The focus detection apparatus according to claim 5, wherein, if the first information is set to 1 in a case where the condition is satisfied and if the first information is set to 0 in a case where the condition is not satisfied, the threshold is set smaller in a case where image height of the photoelectric conversion unit corresponding to the second signals is first image height than in a case where the image height is second image height which is lower than the first image height.

7. The focus detection apparatus according to claim 3, wherein the threshold is changed in accordance with signal levels of the second signals.

8. The focus detection apparatus according to claim 7, wherein, if the first information is set to 1 in a case where the condition is satisfied and if the first information is set to 0 in a case where the condition is not satisfied, the threshold is smaller in a case where the signal level of the second signals is a first signal level than in a case where the signal level of the second signals is a second signal level which is greater than the first signal level.

9. The focus detection apparatus according to claim 1, wherein the generation unit selects pieces of the first information corresponding to a predetermined number of the largest coefficients out of the plural pieces of the first information corresponding to the plurality of the first signals used in the filter processing.

10. The focus detection apparatus according to claim 9, wherein, in a case where the predetermined number is plural, if there is one or more pieces of first information indicating that the condition is satisfied, the generation unit outputs information indicating that the condition is satisfied as the second information.

11. The focus detection apparatus according to claim 9, wherein, in a case where the predetermined number is plural, if a number of pieces of the first information indicating that the condition is satisfied succeeds a threshold, the generation unit outputs information indicating that the condition is satisfied as the second information.

12. The focus detection apparatus according to claim 9, wherein, in a case where the predetermined number is plural, if a number of pieces of the first information indicating that the condition is satisfied is greater than a number of pieces of the first information indicating that the condition is not satisfied, the generation unit outputs information indicating that the condition is satisfied as the second information.

13. The focus detection apparatus according to claim 9, wherein the generation unit sets a smaller value to the predetermined number in a case where image height of the photoelectric conversion unit corresponding to the second signals is first image height than in a case where the image height is second image height which is lower than the first image height.

14. The focus detection apparatus according to claim 9, wherein the generation unit sets a larger value to the predetermined number in a case where a signal level of the second signals is a first signal level than in a case where the signal level is a second signal level which is larger than the first signal level.

15. The focus detection apparatus according to claim 1, wherein the filter processing is weighted addition using the coefficients.

16. The focus detection apparatus according to claim 1, wherein the focus detection unit generates a pair of focus detection signals from the plurality of the second signals and detects the focus state using a phase difference method.

17. An image capturing apparatus comprising:
an image sensor which has a plurality of microlenses and photoelectric conversion units, each of the microlenses corresponding to a plurality of the photoelectric conversion units; and
a focus detection apparatus including:
determination unit that determines whether each of first signals output from the image sensor satisfies a predetermined condition, and outputs first information indicating a result of the determination;
a calculation unit that performs filter processing on the first signals using predetermined coefficients at a predetermined cycle for reducing the number of the first signals and outputs second signals;
a generation unit that generates second information showing an effect of the first signals which satisfies the predetermined condition on the second signals using the coefficients and plural pieces of the first information corresponding to the plurality of the first signals used in the filter processing, wherein each piece of the second information corresponds to each of the second signals; and
a focus detection unit that detects a focus state based on a plurality of the second signals and the second information,
wherein each unit is implemented by one or more processors, circuitry or a combination thereof.

18. A focus detection method comprising:
determining whether each of first signals output from an image sensor satisfies a predetermined condition, and outputting first information indicating a result of the determination, wherein the image sensor has a plurality of microlenses and photoelectric conversion units, each of the microlenses corresponding to a plurality of the photoelectric conversion units;
performing filter processing on the first signals using predetermined coefficients at a predetermined cycle for reducing the number of the first signals and outputting second signals;
generating second information showing an effect of the first signals which satisfies the predetermined condition on the second signals using the coefficients and plural pieces of the first information corresponding to the plurality of the first signals used in the filter processing, wherein each piece of the second information corresponds to each of the second signals; and
detecting a focus state based on a plurality of the second signals and the second information.

19. A non-transitory computer-readable storage medium, the storage medium storing a program that is executable by the computer, wherein the program includes program code for causing the computer to function as a focus detection apparatus which comprises:
a determination unit that determines whether each of first signals output from an image sensor satisfies a predetermined condition, and outputs first information indicating a result of the determination, wherein the image sensor has a plurality of microlenses and photoelectric conversion units, each of the microlenses corresponding to a plurality of the photoelectric conversion units;
a calculation unit that performs filter processing on the first signals using predetermined coefficients at a predetermined cycle for reducing the number of the first signals and outputs second signals;
a generation unit that generates second information showing an effect of the first signals which satisfies the predetermined condition on the second signals using the coefficients and plural pieces of the first information corresponding to the plurality of the first signals used in the filter processing, wherein each piece of the second information corresponds to each of the second signals; and a focus detection unit that detects a focus state based on a plurality of the second signals and the second information.

* * * * *